(12) United States Patent
Fabischek (10) Patent No.: US 10,981,208 B2
(45) Date of Patent: Apr. 20, 2021

(54) LASER SINTERED DIE SURFACE FOR A TOOL

(71) Applicant: MAGNA INTERNATIONAL INC., Ontario (CA)

(72) Inventor: Mark Anthony Fabischek, Ontario (CA)

(73) Assignee: MAGNA INTERNATIONAL INC., Ontario (CA)

( * ) Notice: Subject to any disclaimer, the term of this patent is extended or adjusted under 35 U.S.C. 154(b) by 496 days.

(21) Appl. No.: 15/568,022

(22) PCT Filed: Apr. 22, 2016

(86) PCT No.: PCT/IB2016/052318
§ 371 (c)(1),
(2) Date: Oct. 20, 2017

(87) PCT Pub. No.: WO2016/170516
PCT Pub. Date: Oct. 27, 2016

(65) Prior Publication Data
US 2018/0141098 A1     May 24, 2018

Related U.S. Application Data

(60) Provisional application No. 62/151,614, filed on Apr. 23, 2015.

(51) Int. Cl.
*B21D 22/20* (2006.01)
*B21D 37/16* (2006.01)
*B21D 53/88* (2006.01)

(52) U.S. Cl.
CPC ........... *B21D 22/208* (2013.01); *B21D 37/16* (2013.01); *B21D 53/88* (2013.01)

(58) Field of Classification Search
CPC .... B21D 24/16; B21D 22/208; B21D 22/022; B21D 37/16
See application file for complete search history.

(56) References Cited

U.S. PATENT DOCUMENTS

| | | | |
|---|---|---|---|
| 6,882,895 | B1 | 4/2005 | Knoppers et al. |
| 2006/0230806 | A1 | 10/2006 | Bohner et al. |

(Continued)

FOREIGN PATENT DOCUMENTS

CN     103521581 A     1/2014

OTHER PUBLICATIONS

International Preliminary Report on Patentability PCT/IB2016/052318 dated Oct. 24, 2017.

(Continued)

*Primary Examiner* — Teresa M Ekiert
(74) *Attorney, Agent, or Firm* — Pillsbury Winthrop Shaw Pittman LLP (57) ABSTRACT

A forming system includes a first die, a second die, and a cooling system. A sintered material is formed on opposing portions of the first and second die surfaces to form a relatively low thermal conductive die region. The first die and the second die have opposing, relatively high thermal conductive surfaces to form a relatively high thermal conductive die region. The cooling system is disposed in a thermal conductive relation with the relatively high thermal conductive surfaces. The sintered material on the opposing portions of the first and second die surfaces cooperate to be on opposite sides of the work piece received in the die cavity. Portions of the work piece in direct contact with the sintered material are cooled at a cooling rate slower than that of portions of the work piece that are in direct contact with the relatively high thermal conductive surfaces.

14 Claims, 6 Drawing Sheets

(56) References Cited

U.S. PATENT DOCUMENTS

2012/0186705 A1     7/2012   Sikora et al.
2014/0311205 A1    10/2014   Banik et al.

OTHER PUBLICATIONS

International Search Report PCT/IB2016/052318 dated Jul. 11, 2016.
Written Opinion of the International Searching Authority PCT/IB2016/052318 dated Jul. 11, 2016.

LASER SINTERED DIE SURFACE FOR A TOOL

CROSS-REFERENCE TO RELATED APPLICATIONS

This application is the U.S. National Stage of PCT/IB2016/052318, filed Apr. 22, 2016, which in turn claims priority to U.S. Provisional Application No. 62/151,614, filed Apr. 23, 2015, the entire contents of both of these applications are incorporated herein by reference in their entireties.

FIELD

The present patent application relates to a hot forming system for producing a vehicle body assembly.

BACKGROUND

Vehicle manufacturers strive to provide vehicles that are increasingly stronger, lighter and less expensive. For example, vehicle manufacturers have expended significant efforts to utilize non-traditional materials, such as sheet aluminum, advanced high strength steels, and ultra-high strength steels, for portions of the vehicle body. While such materials may be both relatively strong and light, they are typically costly to purchase, form and/or assemble.

One proposed solution includes the use of heat-treated sheet steel panel members to form the vehicle body. In some applications, the sheet steel panel members are formed in a conventional forming process and subsequently undergo a heat-treating operation. This two-stage processing may be disadvantageous in that the additional operation may add significant cost and time.

As an alternative to a process that employs a discrete heat-treating operation, it is known that certain materials, such as boron steels, may be simultaneously formed and quenched in a hot forming die. In this regard, a pre-heated sheet stock may be typically introduced into a hot forming die, formed to a desired shape and quenched subsequent to the forming operation while in the die to thereby produce a heat treated component. The known hot forming dies for performing the simultaneous hot forming and quenching steps typically employ water cooling passages (for circulating cooling water through the hot forming die) that are formed in a conventional manner.

The present patent application provides improvements to hot forming systems and hot forming operations.

SUMMARY

One aspect of the present patent application provides a forming system that includes a first die having a first die body and a first die surface; a second die having a second die body and a second die surface; and a cooling system operatively associated with the first die and the second die. The first and the second die surfaces are configured to cooperate to form a die cavity therebetween so as to receive a work piece therein. A sintered material is formed on opposing portions of the first and second die surfaces to form a relatively low thermal conductive die region. The first die and the second die have opposing, relatively high thermal conductive surfaces to form a relatively high thermally conductive die region. The cooling system is disposed in a thermal conductive relation with the relatively high thermal conductive surfaces of the first and the second dies. The relatively high thermal conductive surfaces of the first die and the second die cooperate to be on opposite sides of the work piece received in the die cavity, and the sintered material on the opposing portions of the first and the second die surfaces cooperate to be on opposite sides of the work piece received in the die cavity. Portions of the work piece in direct contact with the sintered material are cooled at a cooling rate slower than that of portions of the work piece that are in direct contact with the relatively high thermal conductive surfaces.

Another aspect of the present patent application provides a forming system that includes a first die having a first die body and a first die surface; a second die having a second die body and a second die surface; and a cooling system operatively associated with the first die and the second die. The first and the second die surfaces are configured to cooperate to form a die cavity therebetween so as to receive a work piece therein. A thermal insulation material formed, using an additive manufacturing procedure, on opposing portions of the first and second die surfaces to form a relatively low thermal conductive die region. The first die and the second die have opposing, relatively high thermal conductive surfaces to form a relatively high thermally conductive die region. The cooling system is disposed in a thermal conductive relation with the relatively high thermal conductive surfaces of the first and the second dies. The relatively high thermal conductive surfaces of the first die and the second die cooperate to be on opposite sides of the work piece received in the die cavity, and the thermal insulation material formed on the opposing portions of the first and the second die surfaces cooperate to be on opposite sides of the work piece received in the die cavity. Portions of the work piece in direct contact with the thermal insulation material are cooled at a cooling rate slower than that of portions of the work piece that are in direct contact with the relatively high thermal conductive surfaces.

Yet another aspect of the present patent application provides a method for forming a vehicle body member. The method includes forming a work piece in a die system to form the vehicle body member and cooling the vehicle body member in the die system, wherein portions of the vehicle body member in direct contact with the thermal insulation die region are cooled at a cooling rate slower than that of portions of the vehicle body member that are in direct contact with the cooling die region. The die system has a thermal insulation die region and a cooling die region. The thermal insulation die region includes opposing, relatively low thermal conductive surfaces that include thermal insulation material. The thermal insulation material is formed on a first die and a second die of the die system by an additive manufacturing procedure.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein.

As used in the specification and in the claims, the singular form of "a", "an", and "the" include plural referents unless the context clearly dictates otherwise.

DETAILED DESCRIPTION

Figure 1:
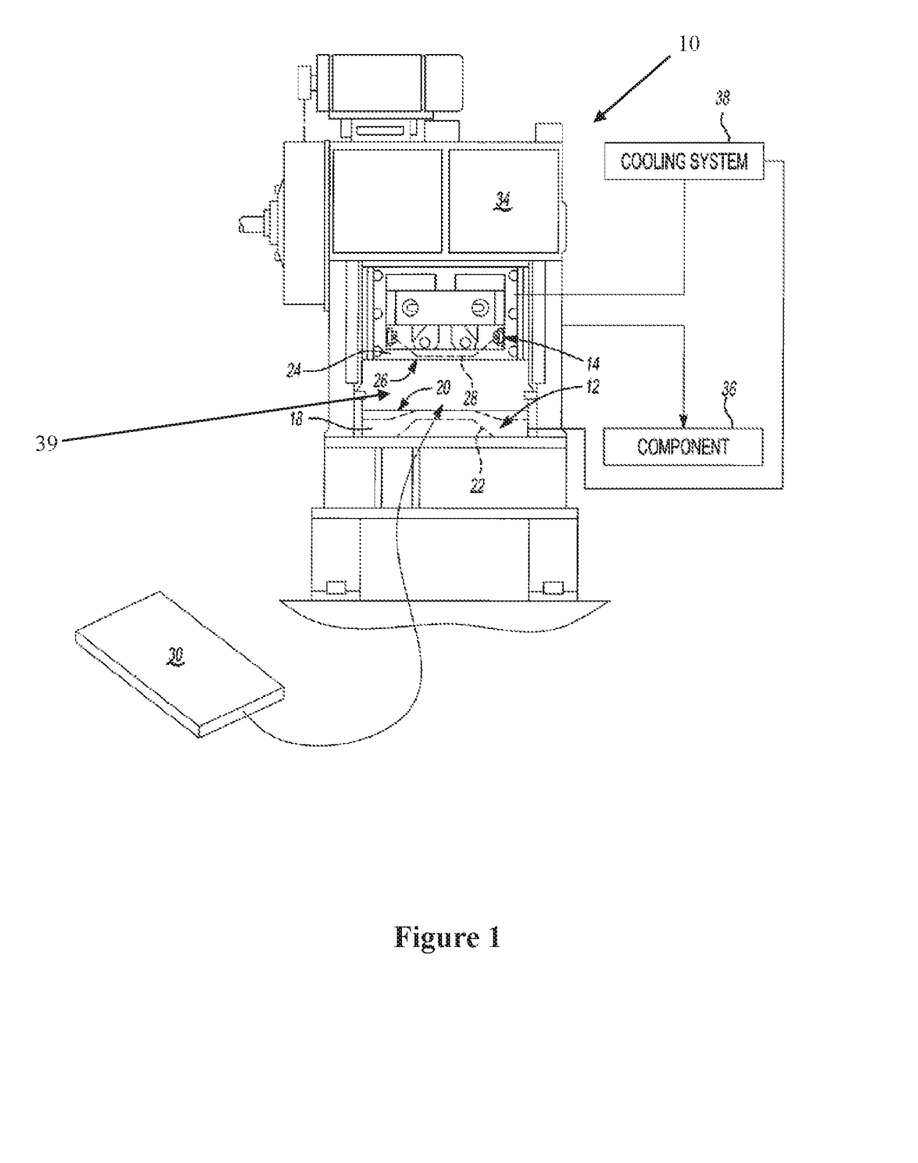
FIG. 1 is a schematic diagram of a hot forming system in accordance with an embodiment of the present patent application.
Figure 2:
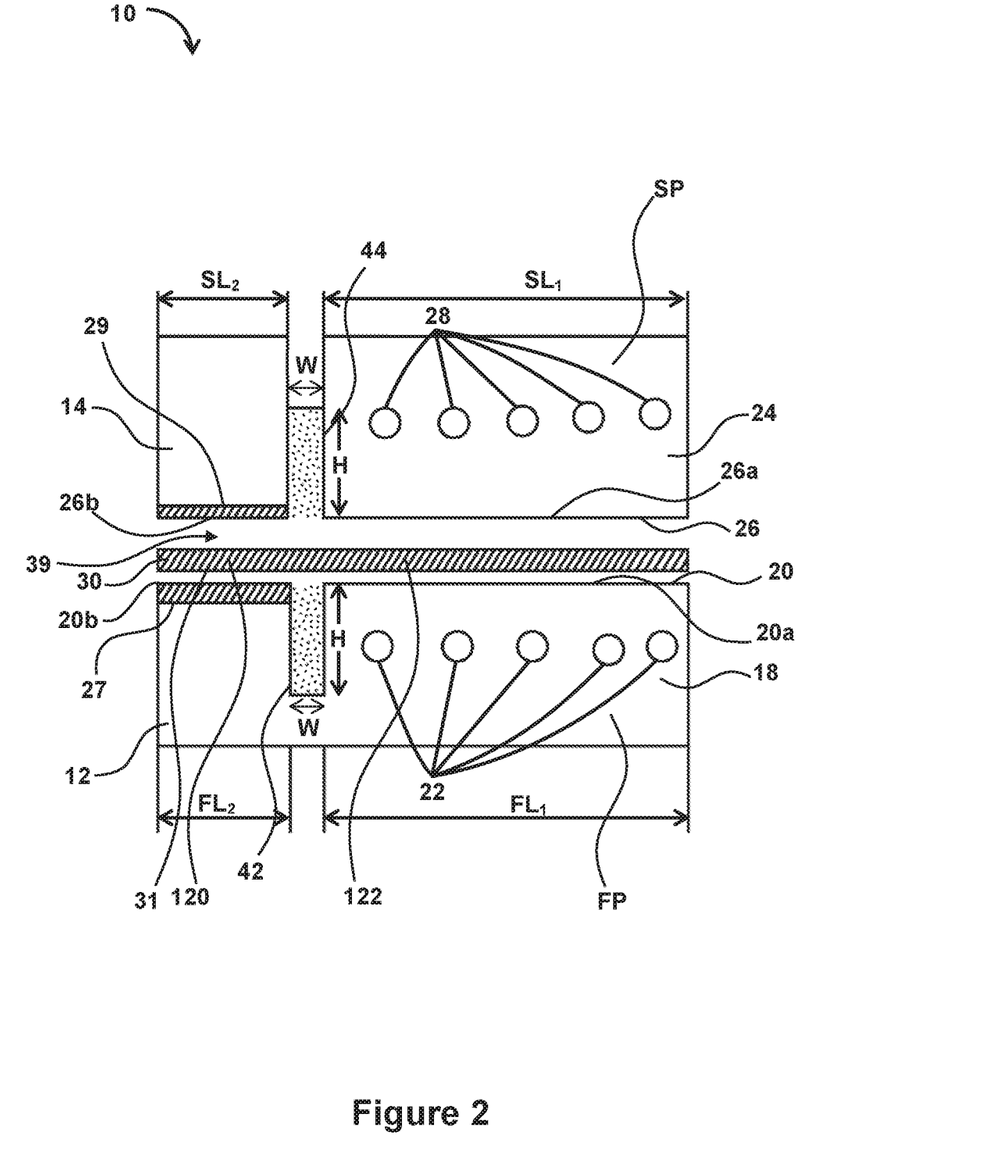
FIG. 2 is another schematic diagram of the hot forming system, in which some portions of the hot forming system are not shown for the sake of clarity, in accordance with an embodiment of the present patent application.

FIGS. 1 and 2 show a hot forming system 10 for producing a vehicle body assembly or a vehicle body member. Referring to FIGS. 1 and 2, the hot forming system 10 includes a first die 12, a second die 14, and a cooling system 38 operatively associated with the first die 12 and the second die 14.

In illustrative embodiment, the first die 12 is shown as a lower die. In another embodiment, the first die 12 may be an upper die. The first die 12 has a first die body 18 and a first die surface 20. In one embodiment, the first die body 18 may be formed of a heat conducting material such as tool steel, in particular DIEVAR®, which is marketed by Bohler-Uddeholm Corporation of Rolling Meadows, Ill., or commercially available H-11 or H-13. In one embodiment, the first die surface 20 may include a complex forming die surface. The first die body 18 may also include a plurality of cooling channels 22 in at least a portion thereof. In one embodiment, the cooling channels 22 may be formed in a portion FP (e.g., having a length of $FL_1$) of the first die body 18.

In illustrative embodiment, the second die 14 is shown as an upper die. In another embodiment, the second die 14 may be a lower die. In one embodiment, the second die 14 may include a second die body 24 that may be formed of a tool steel, such as DIEVAR® or commercially available H-11 or H-13, a second die surface 26 and a plurality of cooling channels 28 in at least a portion thereof. In one embodiment, the cooling channels 28 may be formed in a portion SP (e.g., having a length of $SL_1$) of the second die body 24. In one embodiment, the second die surface 26 may include a complex forming die surface.

As used herein, the term "die surface" refers to the portion of the exterior surface of a die that forms a hot formed component. Moreover, the term "complex die surface" as used in this description means that the die surface has a three-dimensionally contoured shape.

The hot forming die set 12 and 14 may be mounted in a stamping press 34 and may be coupled to the cooling system 38.

In one embodiment, the stamping press 34 may be configured to close the first and second dies 12 and 14 in a die action direction to deform a work piece 30 received between the first and second dies 12 and 14 so as to form and optionally trim a hot formed member 36. In one embodiment, the stamping press 34 may be configured to maintain the dies 12 and 14 in a closed relationship for a predetermined amount of time to permit the hot formed member 36 to be cooled to a desired temperature.

The cooling system 38 may include a source of cooling fluid. In one embodiment, cooling fluid may include water, gas or other fluid medium. Cooling fluid, provided by the cooling system 38, may be continuously circulated through the cooling channels 22 and 28 to cool the dies 12 and 14, respectively. In one embodiment, the cooling system 38 may include a reservoir/chiller and a fluid pump. It may be appreciated that circulating cooling fluids cools the dies 12 and 14 and that the dies 12 and 14 quench and cool the hot formed member 36.

In one embodiment, the cooling channels 22, 28 may be formed by techniques such as gun drilling that yield straight channels extending through the respective die bodies. In one embodiment, the cooling channels 22, 28 are formed by gun drilling the cooling channels through one or two sides of the respective die bodies.

In one embodiment, each cooling channel 22 may be offset from the die surface 20 by a first predetermined distance and this distance may be consistent along the length of the cooling channels 22. Similarly, each cooling channel 28 may be offset from the die surface 26 by a second predetermined distance, which may be different from the first predetermined distance, and this distance may be consistent along the length of the cooling channels 28. In another embodiment, the second predetermined distance may be the same as the first predetermined distance.

The first and the second die surfaces 20 and 26 are configured to cooperate to form a die cavity 39 therebetween so as to receive the work piece 30 therein. In one embodiment, the die cavity 39 is configured to have a shape that corresponds to a final shape of the work piece after the hot forming operation/procedure.

In one embodiment, the work piece 30 may be a blank, which may be formed of a heat-treatable steel, such as boron steel. In another embodiment, the work piece 30 may be stamped from a sheet of hardenable steel, such as Usibor® 1500P or Usibor® 1500, boron steel or any suitable hot stamp press hardened material. In one embodiment, the work piece 30 may be pre-shaped specifically for producing a desired shaped hot formed product, such as, for example, by an additional cutting procedure or an additional cold forming procedure. In one embodiment, the additional cutting procedure or additional cold forming procedure may be optional. In one embodiment, the work piece 30 may include two regions 120 and 122 that correspond to two regions 120 and 122 of the hot formed member 36.

In one embodiment, the hot formed member 36 is a vehicle body member or vehicle body assembly. In one embodiment, the vehicle body component that is formed or produced by the system of FIGS. 1 and 2 may include a B column or B pillar for a vehicle. Of course, other types of members may be produced in a similar fashion, and the example of the B pillar is provided merely for illustrative purposes and in order to facilitate a better understanding of the embodiments of the present patent application.

In one embodiment, the first die surface 20 includes a relatively high thermal conductive surface 20a and a relatively low thermal conductive surface 20b. In one embodiment, the second die surface 26 includes a relatively high thermal conductive surface 26a and a relatively low thermal conductive surface 26b. For example, the opposing, relatively high thermal conductive surfaces 20a and 26a may have length dimensions of $FL_1$ and $SL_1$, respectively and the opposing, relatively low thermal conductive surfaces 20b and 26b may have length dimensions of $FL_2$ and $SL_2$, respectively. In illustrative embodiment, the length dimensions of the relatively high thermal conductive surfaces are greater than the length dimensions of the relatively low thermal conductive surfaces. However, in another embodiment, the length dimensions may vary depending on the hot formed member being formed.

In one embodiment, the relatively high thermal conductive surfaces 20a and 26a may have a thermal conductivity about 24 W/m·K. In another embodiment, the relatively high thermal conductive surfaces 20a and 26a may have a thermal conductivity about 25 W/m·K. In yet another embodiment, the relatively high thermal conductive surfaces 20a and 26a may have a thermal conductivity in the range of about 18 W/m·K to about 25 W/m·K. The relatively high thermal conductive surfaces 20a and 26a are configured to be in thermal conductive relation with the cooling system 38. In one embodiment, the opposing, relatively high thermal conductive surfaces 20a and 26a may form a relatively high thermal conductive die region. In one embodiment, the relatively high thermal conductive die region may also be referred to as a cooling die region.

In one embodiment, cooling fluids circulating through the cooling channels 22 formed in the portion FP of the first die body 18 are configured to cool the portion FP of the first die body 18 and the relatively high thermal conductive surface 20a and cooling fluids circulating through the cooling channels 28 formed in the portion SP of the second die body 24 are configured to cool the portion SP of the second die body 24 and the relatively high thermal conductive surface 26a. This process in turn quenches and cools the portion of the hot formed member 36 in contact with the relatively high thermal conductive surfaces 20a and 26a. As will be clear from the discussions below, the relatively high thermal conductive surfaces 20a and 26a cooperate to be on opposite sides of a second region 122 of the member 36. Thus, the cooling fluids circulating through the cooling channels 22 and 28 are configured to cool and quench the second region 122 of the member 36.

In one embodiment, a material may be sintered on opposing portions of the first and second die surfaces 20 and 26 to form a relatively low thermal conductive die region. In another embodiment, a material may be formed or deposited, using an additive manufacturing procedure (as described in detail below), on opposing portions of the first and second die surfaces 20 and 26 to form a relatively low thermal conductive die region. In one embodiment, the opposing, relatively low thermal conductive surfaces 20b and 26b may form the relatively low thermal conductive die region. In one embodiment, the relatively low thermal conductive die region may also be referred to as a thermal insulation die region.

In one embodiment, the relatively low thermal conductive surfaces 20b and 26b may include thermal insulation material 27 and 29, respectively. In one embodiment, the thermal insulation material may include a very low thermal conductivity material. In one embodiment, the relatively low thermal conductive surfaces 20b and 26b may have a thermal conductivity of less than 5 W/m·K. In another embodiment, the relatively low thermal conductive surfaces 20b and 26b may have a thermal conductivity of less than 1 W/m·K. In yet another embodiment, the relatively low thermal conductive surfaces 20b and 26b may have a thermal conductivity in range of about 0.1 W/m·K to about 5 W/m·K. In yet another embodiment, the relatively low thermal conductive surfaces 20b and 26b may have a thermal conductivity in range of about 2 W/m·K to about 10 W/m·K. In one embodiment, the thermal insulation material may have high heat/thermal resistance. In one embodiment, the thermal insulation material may be configured to limit the hardening in a first region 120 of the hot formed member 36. In one embodiment, the thermal insulation material may include metal based alloy material. In one embodiment, the thermal insulation material may include low thermal conductivity Titanium alloy materials having a thermal conductivity in the range of about 7 W/m·K to about 8 W/m·K. In another embodiment, the thermal insulation material may include glass fiber reinforced composite materials having a thermal conductivity in the range of about 0.9 W/m·K to about 3 W/m·K. In yet another embodiment, the thermal insulation material may include advanced ceramic materials having a thermal conductivity of about 3 W/m·K. For example, in one embodiment, the advanced ceramic materials may include Nano-$ZrO_2$. In one embodiment, the thermal insulation material may be configured to be easily (thermally) joined to the respective die bodies. In one embodiment, the thermal insulation material may be configured to have high wear resistance and withstand high temperature ranges. In one embodiment, the thermal insulation material may have a temperature resistance (or melt resistance) at 800° C.

In one embodiment, the thermal insulation material may be configured to have fracture toughness (i.e., withstand/resist fracture). In one embodiment, the thermal insulation material may have a fracture toughness in the range of about 3 MPa·$M^{1/2}$ to about 65 MPa·$m^{1/2}$. In one embodiment, the thermal insulation material may be configured to have both good fracture toughness properties and low thermal conductivity properties.

In one embodiment, the thermal insulation material may have an Ultimate Tensile Strength in the range of about 600 MPa to about 1500 MPa. In one embodiment, the thermal insulation material may have a Yield Strength in the range of about 400 MPa to about 1200 MPa. In one embodiment, the thermal insulation material may have an elongation in the range of about 1% to about 20%.

In one embodiment, the thermal insulation material may have powdered material configuration. In one embodiment, the thermal insulation material may be sprayed on to the die bodies. In one embodiment, the thermal insulation material may be in the form of a coating. In one embodiment, the thermal insulation material may include a thermal spray multilayer coating having a thermal conductivity in the range of about 1.9 W/m·K to about 3 W/m·K.

In one embodiment, the thermal insulation material may have block configuration. In one embodiment, the thermal insulation block may be formed by an additive manufacturing procedure. In one embodiment, the thermal insulation block may be bolted to the die bodies (e.g., steel sub-block). In one embodiment, if the thermal insulation material has the block configuration, the thermal insulation block itself may serve as the die body on the first side 120. In one embodiment, the thermal insulation block may be thicker than the thermal insulation material in the powdered or coating configuration.

In one embodiment, the thickness of the thermal insulation material 27 and 29 may depend on the desired mechanical (ductility/reduced strength) properties in the first region 120 of the hot formed member 36. In one embodiment, the thermal conductivity properties of the thermal insulation material may be inversely proportional to the thickness of the thermal insulation material. In one embodiment, the thickness of the thermal insulation material 27 and 29 may be in range from about 0.5 mm to about 5 mm. In one embodiment, the thickness of the thermal insulation material 27 and 29 may be about 1 mm. In one embodiment, the thermal conductivity of the thermal insulation material 27 and 29 may depend on the desired mechanical (ductility/reduced strength) properties in the first region 120 of the hot formed member 36.

In one embodiment, portions of the work piece 30 in direct contact with the thermal insulation material 27 and 29 are cooled at a cooling rate slower than other portions of the work piece 30 in direct contact with the relatively high thermal conductive surfaces 20a and 26a. In one embodiment, portions of the work piece 30 in direct contact with the sintered (thermal insulation) material 27 and 29 are cooled at a cooling rate slower than other portions of the work piece 30 in direct contact with the relatively high thermal conductive surfaces 20a and 26a. In one embodiment, the thermal insulation material may be configured to slow the cooling rate of the portions of the work piece 30 in direct contact with the thermal insulation material 27 and 29 so as to achieve "soft zones" in those portions of the work piece 30. In one embodiment, soft zone may be a region having low/reduced hardness/tensile strength properties and high ductility/yield/elongation properties.

In one embodiment, the dies 12 and 14 are configured such that, in the area/region of the member 36 where a soft zone is desired, the surfaces of the dies 12 and 14 have low conductivity/thermal insulation material. For example, as shown in FIG. 3B, for a B column or B pillar for a vehicle, it may be desired to have a relatively high ductile (or reduced strength/hardness) region 120 (soft zone) and a high strength/hardness region 122. In one embodiment, the relatively low thermal conductive surfaces 20b and 26b that are in direct contact with the first region 120 of the member 36 are configured to allow the first region 120 to be cooled at a cooling rate slower than the second region 122, thus, creating the soft zone in the first region 120.

In one embodiment, the soft zone may include a microstructure, for example, martensite mixed with varying amounts of bainite and/or ferrite (having ductile properties). In yet another embodiment, the soft zone may include any microstructure having high ductile properties or reduced strength/hardness properties.

Figure 2A:
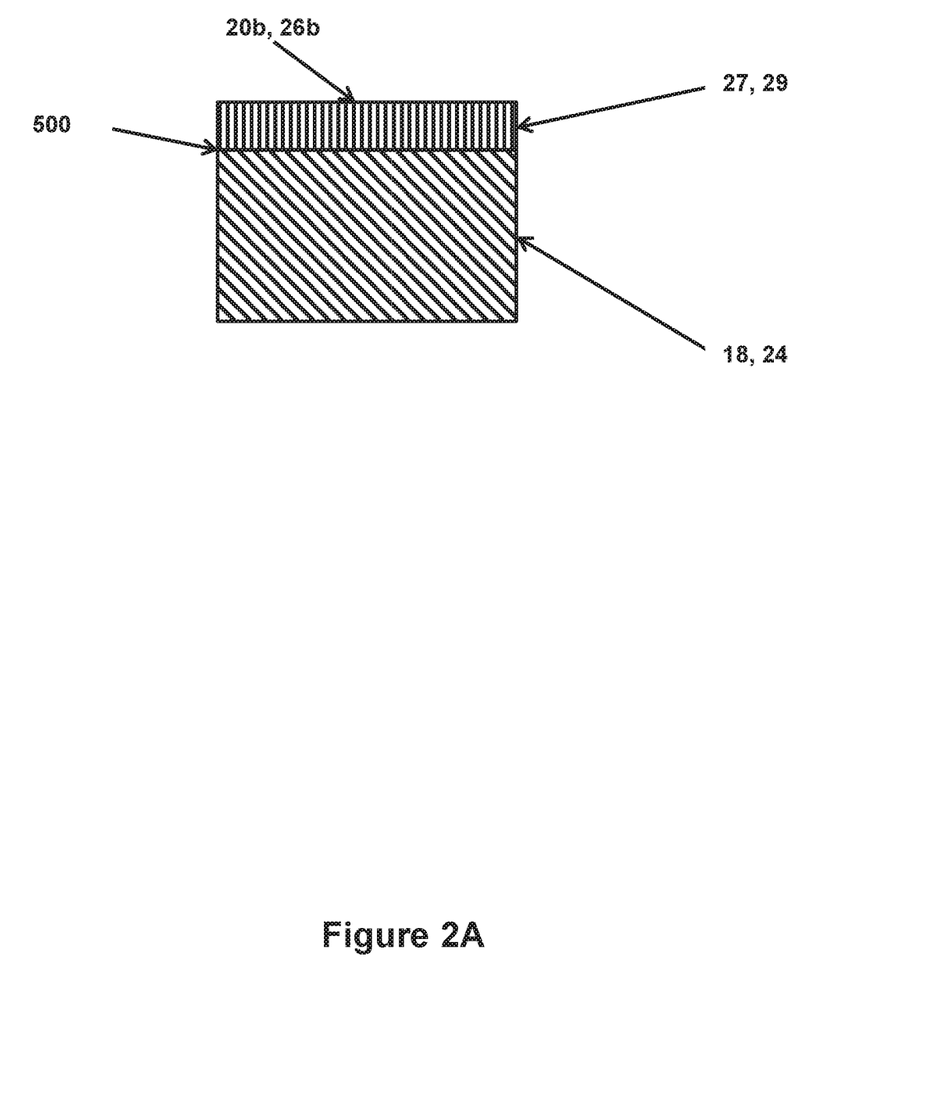
FIG. 2A is a schematic diagram of a die body with thermal insulation material thermally joined to the die body in accordance with an embodiment of the present patent application.

In one embodiment, as shown in FIG. 2A, the thermal insulation material 27 and 29 may be thermally joined to their respective die bodies 18, 24 to form the relatively low thermal conductive surfaces 20b and 26b, respectively. In one embodiment, the thermal insulation material 27 and 29 may be formed on the die bodies using a laser sintering procedure. The laser sintering procedure is an additive manufacturing procedure in which a laser device is used as the power source to sinter powdered thermal insulation material. The procedure also includes binding the material together to form the desired geometry of the thermal insulation material. In one embodiment, the desired geometry of the thermal insulation material is formed (i.e., built up additively) layer by layer. In one embodiment, the laser sintering procedure may be selective laser sintering or direct metal laser sintering.

In one embodiment, the laser sintering procedure is configured to provide a uniform molecular thermal bond 500 between the thermal insulation material 27 and 29 and their respective die bodies, for example, without air pockets or weld slag.

In another embodiment, the thermal insulation material 27 and 29 may be formed on the die bodies using a laser metal deposition procedure. The laser metal deposition procedure generally uses a laser device as the power source to form a melt pool on a substrate material (e.g., metallic substrate). Thermal insulation material (e.g., powder) is fed into the melt pool and is absorbed into the melt pool to form a deposit that is fusion bonded to the substrate material. Like the laser sintering procedure, the laser metal deposition procedure is an additive manufacturing procedure in which the desired geometry of the thermal insulation material is formed (i.e., built up additively) layer by layer.

In other embodiments, other additive manufacturing procedures, which are similar to the laser metal deposition procedure and the laser sintering procedure (described above), may be used in the present patent application. In one embodiment, the additive manufacturing procedure may generally refer to a procedure in which the thermal insulation material is formed on the respective die surface(s) by adding layer-upon-layer of thermal insulation material. In one embodiment, the additive manufacturing procedure is configured to provide a uniform molecular thermal bond between the thermal insulation material 27 and 29 and their respective die bodies, for example, without air pockets or weld slag. In one embodiment, laser melting procedure may be used to deposit or form thermal insulation material layer(s) on the respective die surface(s).

In one embodiment, the relatively high thermal conductive surface 20a and the relatively low thermal conductive surface 20b of the die 12 are separated by an insulator portion 42. In one embodiment, the insulator portion 42 is arranged and configured to provide and maintain thermal separation/insulation between the relatively high thermal conductive surface 20a and the relatively low thermal conductive surface 20b. In one embodiment, the insulator portion 42 is designed in such a way that it provides sufficient thermal barrier between the relatively high thermal conductive surface 20a and the relatively low thermal conductive surface 20b.

Similarly, the relatively high thermal conductive surface 26a and the relatively low thermal conductive surface 26b of the die 14 are separated by an insulator portion 44. In one embodiment, the insulator portion 44 is arranged and configured to provide and maintain thermal separation/insulation between the relatively high thermal conductive surface 26a and the relatively low thermal conductive surface 26b. In one embodiment, the insulator portion 44 is designed in such a way that it provides sufficient thermal barrier between the relatively high thermal conductive surface 26a and the relatively low thermal conductive surface 26b.

In one embodiment, the insulator portions 42 and 44 may be air gaps. That is, in one embodiment, the insulating material/substance in the insulator portions 42 and 44 may be air. In another embodiment, the insulating material/substance in the insulator portions 42 and 44 may include solid insulating materials. In one embodiment, the insulator portions 42 and 44 each may have a rectangular shaped configuration.

In one embodiment, the insulator portions 42 and 44 each may have a height dimension, H and a width dimension, W. In another embodiment, the insulator portions 42 and 44 each may have other shaped configurations. In one embodiment, the shape and dimensions of the insulator portion and the nature of the insulating material may vary depending on the hot formed member 36 being formed in the system 10. For example, when the hot formed member 36 being formed in the system 10 is a B column or B pillar for a vehicle, the width dimension, W of the insulator portions 42 and 44 may be about 5 mm. In one embodiment, the height dimension, H of the insulator portions 42 and 44 may be in the range of about 25% to about 100% of the total height of the respective die body.

Figure 3A:
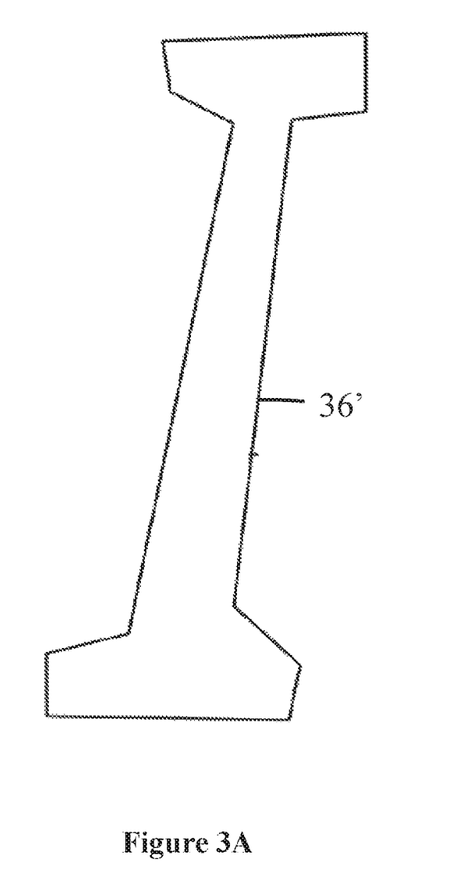
FIG. 3A shows a top view of an exemplary B column having substantially uniform tensile strength, as formed by a conventional hot forming process.
Figure 3B:
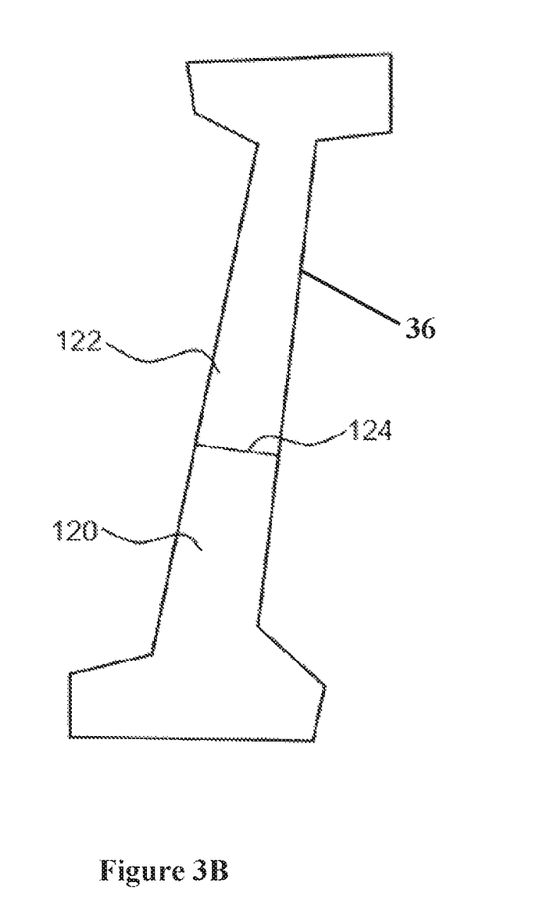
FIG. 3B shows a top view of an exemplary B column having substantially two regions of different tensile strength formed by the hot forming system in accordance with an embodiment of the present patent application.

FIG. 3A shows a hot formed member 36' formed in a conventional die set. The hot formed member 36' has substantially uniformly of martensite structure throughout the hot formed member 36'.

FIG. 3B shows a hot formed member 36 formed in the die set 12 and 14 of the present patent disclosure. FIG. 3B illustrates that the hot formed member 36 includes two regions 120 and 122 of substantially different mechanical properties. In one embodiment, the two regions 120 and 122 may have different tensile strength/hardness properties. In one embodiment, the two regions 120 and 122 may have different ductile/yield/elongation properties.

In one embodiment, the first region 120 may include a microstructure having a reduced tensile strength and the second region 122 may include a microstructure having a high tensile strength. That is, the first region 120 has a tensile strength that is substantially less than the tensile strength of the second region 122. In one embodiment, the first region 120 may include a microstructure with high ductile properties and the second region 122 has a martensite structure.

In one embodiment, the relatively low thermal conductive surfaces 20b and 26b cooperate to be on opposite sides of the first region 120 of the work piece 30 received in the die cavity 39 such that the first region 120 in direct contact with the relatively low thermal conductive surfaces 20b and 26b is cooled at a cooling rate slower than the second region 122 of the work piece 30. That is, due to the slower cooling rate, a microstructure with high ductile properties and reduced strength/hardness is formed within the first region 120 on one side of "boundary" 124, whereas a martensite structure is formed in the second region 122 on the other side of the boundary 124. In one embodiment, a transition zone of finite width may exist along the boundary 124 between the first region 120 and the second region 122. In one embodiment, the tensile strength of the hot formed member 36 within the transition zone or region 124 is intermediate the tensile strength within the first region 120 and the tensile strength within the second region 122.

Figure 4:
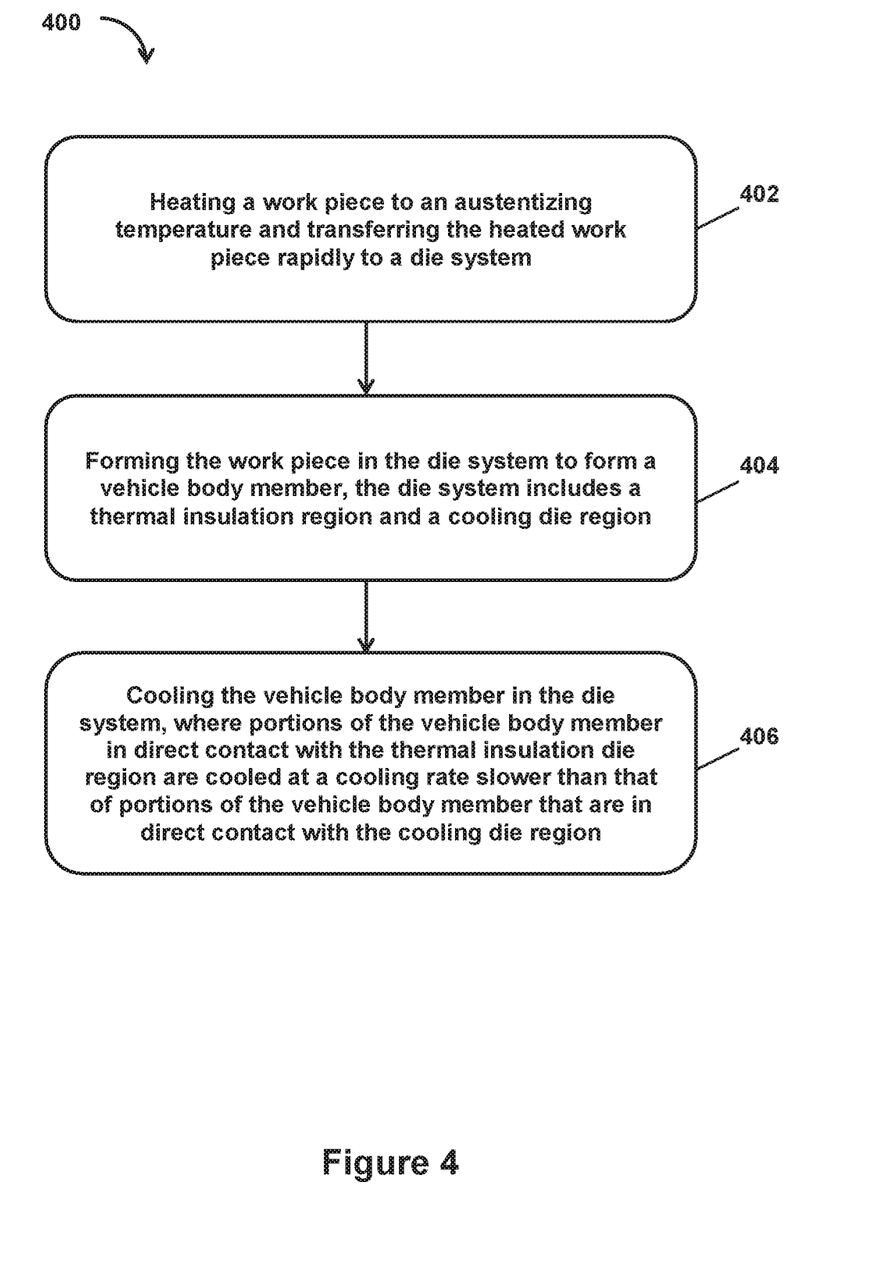
FIG. 4 is a flow diagram of a method for forming a vehicle body member using the hot forming system in accordance with an embodiment of the present patent application.

FIG. 4 shows a flow diagram of a method 400 for forming the hot formed member 36 in the hot forming system 10. In one embodiment, the hot formed member 36 may include a vehicle body member. In one embodiment, the method 400 may include procedures 402 to 406.

At procedure 402, the work piece 30 is heated to an austenitizing temperature during the hot forming and/or press hardening operation. At the procedure 402, the work piece 30 is provided. In one embodiment, the work piece 30 may be stamped from a sheet of hardenable steel, such as Usibor®1500P or Usibor® 1500, boron steel or any suitable hot stamp press hardened material. In one embodiment, the work piece 30 may be pre-shaped specifically for producing a desired shaped hot formed component. For example, the work piece 30 may be pre-shaped using an additional cutting procedure or an additional cold forming procedure.

The work piece 30 (e.g., stamped or pre-shaped) is heated to the austenite state. For example, the work piece 30 is heated in an oven or a furnace (e.g., a roller-hearth or a batch style) to a temperature above the Ac3 temperature. In one embodiment, the work piece 30 may be pre-heated to a predetermined temperature, such as about 930° C. In one embodiment, the work piece 30 may be pre-heated to a predetermined temperature, such as about 900° C. In one embodiment, the work piece 30 is heated such that its structure is substantially (if not entirely) composed of austenite. Once the work piece 30 is in the austenite state, the work piece 30 may be transferred quickly/rapidly to the die set 12 and 14.

At procedure 404, the work piece 30 (in the austenite state) undergoes hot forming operation to form the hot formed member 36. In one embodiment, the heated work piece 30 may be formed between the dies 12 and 14. At the procedure 404, the heated work piece 30 is placed in the die cavity 39 between the first and the second die surfaces 20 and 26 of the dies 12 and 14. In one embodiment, the die cavity 39 is configured to have a shape that corresponds to a final shape of the work piece after the hot forming procedure.

In one embodiment, the system 10 may include a work piece holder that assumes the complete holding function for the work piece 30. That is, the work piece 30 may be clamped between holding members of the work piece holder. One of the holding members may be operated (i.e., opened and closed) by an actuator (e.g., operated hydraulically and/or by an elastic force). In one embodiment, the work piece holder may be optional.

When the work piece 30 is received in the die cavity 39, it is positioned such that the relatively high thermal conductive surfaces 20a and 26a are on opposite sides of the second region 122 and the relatively low thermal conductive surfaces 20b and 26b are on opposite sides of the first region 120.

The dies 12 and 14 may then be brought together (i.e., closed) in the die action direction via the stamping press 34 to cause the hot formed member 36 to be formed. That is, the first and second dies 12 and 14 may be brought together to deform the work piece 30 so as to form and optionally trim the hot formed member 36.

At procedure 406, while the hot formed member 36 is still inside or between the pair of dies 12 and 14, the member 36 is cooled such that martensite is formed within the second region 122 and a microstructure with high ductile properties and reduced strength/hardness is formed within the first region 120. In one embodiment, the microstructure with high ductile properties and reduced strength/hardness may include martensite microstructure mixed with varying amounts of bainite and/or ferrite.

For example, at procedure 406, the second region 122 is hardened by cooling the second region 122 at a rate of cooling that is sufficiently rapid/fast to form a martensitic structure in the second region 122. At the same time, the first region 120 is maintained in direct contact with the relatively low thermal conductive surfaces 20b and 26b such that the first region 120 is cooled at a cooling rate slower than that of the second region 122 so as to form a microstructure with high ductile properties and reduced strength/hardness in the first region 120.

Deformation and concomitant rapid cooling of the second region 122 within the die halves 12 and 14 produces the second region 122, in which the austenite structure has been transformed into the martensitic structure. The rate of cooling for the second region 122 is sufficiently rapid to support formation of the martensitic structure within the second region 122.

In one embodiment, the channels 22 and 28 defined through the die halves 12 and 14 are configured to allow for a cooling fluid (e.g., water, oil, saline, etc.) to flow/pass therethrough so to remove the heat rapidly from the second region 122 and/or achieve rapid cooling rate of the second region 122. For example, in one embodiment, the cooling rate of the second region 122 may be in the range of about 30° C./second to about 100° C./second.

In one embodiment, the distance between the cooling channels 22 and 28 and the die surfaces 20 and 26, respectively, as well as the mass flow rate of the cooling fluid and the temperature of the cooling fluid may be selected to control the cooling of both the dies 12 and 14 such that the second region 122 is quenched in a controlled manner consistently across its major surfaces to cause a phase transformation to a desired metallurgical state. In one embodiment, the dies 12 and 14 may function as a heat sink to draw heat from and thereby cool the second region 122 in a controlled manner to cause a desired phase transformation (e.g., to martensite) in the second region 122 and optionally to cool the second region 122 to a desired temperature.

The tensile strength and hardness of the second region 122 is substantially uniform throughout. In one embodiment, the tensile strength of the second region 122 is greater than the tensile strength of the first region 120. In one embodiment, the hardness of the second region 122 is greater than the hardness of the first region 120. In one embodiment, the ductility, yield stress and elongation of the second region 122 are less than the ductility, yield stress and elongation of the first region 120.

In one embodiment, the hot formed member 36 is cooled such that a microstructure having high ductile properties and reduced strength/hardness properties is formed within the first region 120 of the hot formed member 36, while at the same time a martensite structure is formed in the second region 122 of the hot formed member 36. That is, the second region 122 remains substantially free of microstructure having high ductile properties and reduced strength/hardness properties.

For example, at procedure 406, the relatively low thermal conductive surfaces 20b and 26b cooperate to be on opposite sides of the first region 120 of the hot formed member 36 received in the die cavity 39 such that the first region 120 in direct contact with the relatively low thermal conductive surfaces 20b and 26b is cooled at a cooling rate slower than that of the second region 122 that is in direct contact with the relatively high thermal conductive surfaces 20a and 26a.

In one embodiment, the first region 120 in direct contact with the relatively low thermal conductive surfaces 20b and 26b is cooled from about 900° C. to 550° C. in about 7 to 8 seconds and the second region 122 in direction contact with the relatively high thermal conductive surfaces is cooled from about 900° C. to 200° C. in about 7 to 8 seconds. In one embodiment, the cycle time for the hot formed member 36 is about 7 to 8 seconds.

In one embodiment, the thermal insulation material of the relatively low thermal conductive surfaces 20b and 26b may be configured to extend the cooling time of the first region 120. In one embodiment, the thermal insulation material of the relatively low thermal conductive surfaces 20b and 26b may be configured to reduce the cooling rate of the first region 120. In one embodiment, the thermal insulation material/low heat/thermal conductive material may be configured to slow down the loss of heat from the first region 120 when the first region 120 is in direct contact with the relatively low thermal conductive surfaces 20b and 26b.

This results in different mechanical properties in the first region 120 than in the second region 122.

The ductility of the first region 120 is substantially uniform throughout. In one embodiment, the ductility of the first region 120 is greater than the ductility of the second region 122. In one embodiment, the elongation of the first region 120 is greater than the elongation of the second region 122. In one embodiment, the yield stress of the first region 120 is greater than the yield stress of the second region 122. In one embodiment, the hardness/tensile strength of the first region 120 are less than the hardness/tensile strength of the second region 122.

In one embodiment, the member 36 may be held inside the die set during the cooling procedure 406 so as to maintain the desired shape of the member 36 while it is being cooled and/or hardened. In one embodiment, a fixture may be used to maintain the dimensions of the member 36 during the cooling procedure 406. In another embodiment, the fixture may be optional.

In one embodiment, the hot formed member 36 may be cooled by the dies 12 and 14 prior to the ejection of the hot formed member 36 from the dies 12 and 14.

In one embodiment, at the end of the cooling procedure 406, the first region 120 of the member 36 may cooled to about room temperature. In one embodiment, the first region 120 is gas-cooled. In another embodiment, the first region 120 may be cooled using another suitable cooling technique, such as, for example, gas-blasting, fluidized bed cooling, die cooling, water/mist cooling, and cooling with the use of cooling fans/jets, etc.

In one embodiment, after being removed from the die set 12 and 14, the member 36 may be cooled to about room temperature, or at least to a temperature between about 20° C. and about 250° C. At this stage, the second region 122 of the member 36 has substantially a uniform martensite structure and the first region 120 of the member 36 has substantially a microstructure having uniform, high ductile properties and uniform, reduced hardness/tensile strength properties.

Thereafter, the dies 12 and 14 may be separated from one another (i.e., opened) and the hot formed member 36 may be removed from the die cavity 39. In one embodiment, additional processing procedure(s) may be performed. These additional processing procedure(s) may include trimming, perforating, etc.

In one embodiment, the construction of the hot forming die set 10 in accordance with the teachings of the present disclosure may permit the rate of cooling at each point on the die surface to be controlled in a precise manner. This may be particularly advantageous for high-volume production as it is possible to employ relatively short overall cycle times while achieving a desired metallurgical transformation.

In one embodiment, the present patent application discloses forming two regions, one with martensite structure and the other with microstructure having high ductile properties and reduced hardness/tensile strength properties. However, it is contemplated that the number of regions with martensite and microstructure having high ductile properties may vary in the member 36. In one embodiment, additional "soft zones" within different regions of the member 36 may be formed in a single pass. In one embodiment, two or more non-contiguous "soft zones" may be formed in the member 36.

In one embodiment, the hot formed member may be referred to as a hot stamped member or a hot shaped member. For example, hot stamping allows for the forming of complex part geometries with the final product achieving ultra high strength material properties.

In one embodiment, the system and method of the present patent application may be used to form products having tailored properties. For example, such products may include regions of reduced hardness, reduced strength and/or high ductility/yield/elongation in products. In one embodiment, the system and method of the present patent application may be used to form vehicle body pillars, vehicle rockers, vehicle roof rails, vehicle bumpers and vehicle door intrusion beams.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A forming system comprising:
a first die having a first die surface;
a second die having a second die surface; and
a cooling system operatively associated with the first die and the second die,
wherein the first and the second die surfaces are configured to cooperate to form a die cavity therebetween so as to receive a work piece therein,
a sintered material formed on opposing portions of the first and second die surfaces to form a relatively low thermal conductive die region,
wherein the first die and the second die have opposing, relatively high thermal conductive surfaces to form a relatively high thermal conductive die region,
wherein the relatively high thermal conductive die region has higher thermal conductivity than the relatively low thermal conductive die region,
wherein the cooling system is disposed in a thermal conductive relation with the relatively high thermal conductive surfaces of the relatively high thermal conductive die region of the first and the second dies,
wherein the relatively high thermal conductive surfaces of the first die and the second die cooperate to be on opposite sides of the work piece received in the die cavity, and the sintered material on the opposing portions of the first and the second die surfaces cooperate to be on opposite sides of the work piece received in the die cavity,
wherein portions of the work piece in direct contact with the sintered material are cooled at a cooling rate slower than that of portions of the work piece that are in direct contact with the relatively high thermal conductive surfaces of the relatively high thermal conductive die region that are in thermal conductive relation with the cooling system,
wherein the cooling system includes cooling channels disposed in the relatively high thermal conductive die region to cool the relatively high thermal conductive surfaces of the relatively high thermal conductive die region, and
wherein the sintered material on the opposing portions of the first and second die surfaces in the relatively low thermal conductive die region is at least partially insulated from the cooling channels in the relatively high thermal conductive die region by an insulator region.

2. The forming system of claim 1, wherein the sintered material is formed on the first die and the second die by a laser sintering procedure.

3. The forming system of claim 1, wherein the die cavity is configured to have a shape that corresponds to a final shape of the work piece after a hot forming procedure.

4. The forming system of claim 1, wherein the insulator region includes a first insulator portion and a second insulator portion disposed opposing one another,
wherein the relatively high thermal conductive surface and the relatively low thermal conductive surface of the first die are separated by the first insulator portion, and
wherein the relatively high thermal conductive surface and the relatively low thermal conductive surface of the second die are separated by the second insulator portion.

5. The forming system of claim 1, wherein the portions of the work piece that are in direct contact with the relatively high thermal conductive surfaces include a martensite microstructure.

6. The forming system of claim 1, wherein the portions of the work piece that are in direct contact with the sintered material include a microstructure with reduced hardness properties.

7. The forming system of claim 6, wherein the microstructure includes a martensite structure mixed with varying amounts of bainite and/or ferrite.

8. A forming system comprising:
a first die having a first die surface;
a second die having a second die surface; and
a cooling system operatively associated with the first die and the second die,
wherein the first and the second die surfaces are configured to cooperate to form a die cavity therebetween so as to receive a work piece therein,
a sintered material formed on opposing portions of the first and second die surfaces to form a relatively low thermal conductive die region,
wherein the first die and the second die have opposing, relatively high thermal conductive surfaces to form a relatively high thermal conductive die region,
wherein the relatively high thermal conductive die region has higher thermal conductivity than the relatively low thermal conductive die region,
wherein the cooling system is disposed in a thermal conductive relation with the relatively high thermal conductive surfaces of the relatively high thermal conductive die region of the first and the second dies,
wherein the relatively high thermal conductive surfaces of the first die and the second die cooperate to be on opposite sides of the work piece received in the die cavity, and the sintered material on the opposing portions of the first and the second die surfaces cooperate to be on opposite sides of the work piece received in the die cavity,
wherein portions of the work piece in direct contact with the sintered material are cooled at a cooling rate slower than that of portions of the work piece that are in direct contact with the relatively high thermal conductive surfaces of the relatively high thermal conductive die region that are in thermal conductive relation with the cooling system,
wherein the relatively high thermal conductive surface and the relatively low thermal conductive surface of the first die are separated by a first insulator portion, and wherein the relatively high thermal conductive surface and the relatively low thermal conductive surface of the second die are separated by a second insulator portion.

9. The forming system of claim 8, wherein the cooling system includes cooling channels disposed in the first die and the second die.

10. The forming system of claim 9, wherein the cooling channels are configured to cool the relatively high thermal conductive surfaces and the portions of the work piece that are in direct contact with the relatively high thermal conductive surfaces.

11. The forming system of claim 8, wherein the first insulator portion and the second insulator portion are disposed opposing one another.

12. A forming system comprising:
   a first die having a first die surface;
   a second die having a second die surface; and
   a cooling system operatively associated with the first die and the second die, wherein the first and the second die surfaces are configured to cooperate to form a die cavity therebetween so as to receive a work piece therein,
   a thermal insulation material formed, using an additive manufacturing procedure, on opposing portions of the first and second die surfaces to form a relatively low thermal conductive die region,
   wherein the first die and the second die have opposing, relatively high thermal conductive surfaces to form a relatively high thermal conductive die region,
   wherein the relatively high thermal conductive die region has higher thermal conductivity than the relatively low thermal conductive die region,
   wherein the cooling system is in a thermal conductive relation with the relatively high thermal conductive surfaces of the relatively high thermal conductive die region of the first and the second dies,
   wherein the relatively high thermal conductive surfaces of the first die and the second die cooperate to be on opposite sides of the work piece received in the die cavity, and the thermal insulation material formed on the opposing portions of the first and the second die surfaces cooperate to be on opposite sides of the work piece received in the die cavity,
   wherein portions of the work piece in direct contact with the thermal insulation material are cooled at a cooling rate slower than that of portions of the work piece that are in direct contact with the relatively high thermal conductive surfaces of the relatively high thermal conductive die region that are in thermal conductive relation with the cooling system,
   wherein the cooling system includes cooling channels disposed in the relatively high thermal conductive die region to cool the relatively high thermal conductive surfaces of the relatively high thermal conductive die region, and
   wherein the thermal insulation material on the opposing portions of the first and the second die surfaces in the relatively low thermal conductive die region is at least partially insulated from the cooling channels in the relatively high thermal conductive die region by an insulator region.

13. The forming system of claim 12, wherein the additive manufacturing procedure is a laser metal deposition procedure.

14. The forming system of claim 12, wherein the additive manufacturing procedure is a laser metal sintering procedure.

* * * * *